UNITED STATES PATENT OFFICE.

JULIUS TALUAU, OF PHILADELPHIA, PENNSYLVANIA, ASSIGNOR OF ONE-HALF TO CHARLTON H. ROYAL, OF PHILADELPHIA, PENNSYLVANIA.

PROCESS OF TREATING CASEIN AND COMPOUND OBTAINED THEREFROM.

No. 852,915.     Specification of Letters Patent.     Patented May 7, 1907.

Application filed November 17, 1906. Serial No. 343,850.

*To all whom it may concern:*

Be it known that I, JULIUS TALUAU, a citizen of the United States, residing in Philadelphia, Pennsylvania, have invented an Improved Process of Treating Casein and Compounds Obtained Therefrom, of which the following is a specification.

My invention relates to the manufacture of casein, a material largely employed as a sizing agent or adhesive, and also forming one of the ingredients of the well-known cold-water paints.

The object of my invention is to so treat the casein as to prevent decomposition of the same as well as to improve its valuable sizing and adhesive properties.

It is well understood that exposure of casein to the air after manufacture, even for a short time, will result in rapid decomposition, which condition although not necessarily or unduly affecting its value as a sizing agent or as an adhesive, renders its use highly objectionable. In the manufacture of casein as now ordinarily carried on, it is brought down into the form of powder, to which a suitable alkaline liquid is afterward added to render it fluent for the purpose of use as a size or an adhesive. It is after the casein has been made into a liquid that decomposition sets in and cannot be arrested. The ordinary casein of commerce is that which has been precipitated from skim-milk by the addition of an acid, either sulfuric or muriatic, with or without the use of boracic acid or other treating agent, and I may employ, in the process forming the subject of my invention, any commercial casein made in accordance with any of the well-known methods.

My invention consists of a process of treating the casein in its liquid form, suitable then as a size, adhesive, or as a paint constituent, whereby decomposition is prevented, and its normal sweetened condition is maintained for an indefinite period.

My process or treatment consists in combining with such casein a solution of gum camphor, which material is prepared in a suitable manner for admixture therewith. To the solution of camphor, I may add, under certain conditions, a small proportion of formaldehyde ($CH_2O$) being the 40% solution of commerce known as "formalin."

In carrying my process into effect, I proceed substantially as follows: I prepare the camphor solution by dissolving one ounce of gum camphor in one quart of methyl-alcohol. I then dissolve one and one half pounds of dry or powdered casein in one gallon of water, previously rendered alkaline to effect solution of the casein by the addition of a small quantity of borate of soda, or ammonia as may be most convenient or desirable. To this solution of casein, I add four liquid ounces of the camphor solution, and the mixture thus prepared is subjected to heat that is gradually raised to 170° F., then cooled, and is then ready for use.

As a sizing composition or as an adhesive, the improved compound forming the subject of my invention is in a liquid state. With such compound I may incorporate a perfuming or flavoring agent in the form of one of the ordinary essential oils.

I have found that treatment in accordance with the process forming the subject of my invention renders the casein antiseptic in its nature, prevents decomposition upon exposure to the air, and that when used as a size or as an adhesive, it remains fresh or sweet; at the same time possessing all of the desirable features for which casein is noted and by reason of which it finds large employment in the various arts. The use of alcohol and camphor further improves the sizing qualities of the casein. In preparing the camphor solution I prefer to use methyl-alcohol which may contain an aldehyde. I may use other alcohols for this purpose, however, and in such case I use therewith the small quantity of formaldehyde.

I claim:

1. A liquid, non-decomposing size or adhesive, containing casein, a soluble alkali, and a solution of gum camphor.

2. A non-decomposing size or adhesive, containing casein, gum camphor, and alcohol.

3. A non-decomposing size or adhesive, containing casein, gum camphor, and methyl-alcohol.

4. A non-decomposing size or adhesive, containing casein, gum camphor, alcohol, and formaldehyde.

5. A liquid composition of matter for use as an adhesive or size, comprising a solution of casein, a soluble alkali, and a solution of gum camphor.

6. A composition of matter for use as an adhesive or size, comprising a solution of casein, gum camphor, and alcohol.

7. A composition of matter for use as an adhesive or size, comprising a solution of casein, gum camphor, and methyl-alcohol.

8. A composition of matter for use as an adhesive or size, comprising a solution of casein, gum camphor, alcohol, and formaldehyde.

9. The process of preparing an adhesive or size, which consists in reducing casein to fluent form in an alkaline solution, dissolving gum camphor in alcohol, and incorporating the camphor solution with the casein solution.

10. The process of preparing an adhesive or size, which consists in reducing casein to fluent form in an alkaline solution, dissolving gum camphor in methyl-alcohol, and incorporating the camphor solution with the casein solution.

11. The process of preparing an adhesive or size, which consists in reducing casein to fluent form in an alkaline solution, dissolving gum camphor in alcohol, adding a small quantity of formaldehyde thereto, and then incorporating the camphor solution with the casein solution by any suitable means.

12. The process of preparing a sizing composition, which consists in reducing powdered casein to fluent form in an alkaline solution, dissolving gum camphor in alcohol, and then incorporating the camphor solution with the casein solution by the agency of heat.

13. The process of preparing a sizing composition, which consists in reducing powdered casein to fluent form in an alkaline solution, dissolving gum camphor in methyl-alcohol, and then incorporating the camphor solution with the casein solution by the agency of heat.

14. The process of preparing a sizing composition, which consists in reducing powdered casein to fluent form in an alkaline solution, dissolving gum camphor in alcohol, adding a small quantity of formaldehyde thereto, and then incorporating the camphor solution with the casein solution by the agency of heat.

In testimony whereof, I have signed my name to this specification, in the presence of two subscribing witnesses.

JULIUS TALUAU.

Witnesses:
MURRAY C. BOYER,
WM. E. SHUPE.